US010778752B1

(12) United States Patent
Corbett et al.

(10) Patent No.: US 10,778,752 B1
(45) Date of Patent: Sep. 15, 2020

(54) SYSTEM AND METHOD FOR LOW POWER WIDE AREA VIRTUAL NETWORK FOR IOT

(71) Applicant: Senet, Inc., Portsmouth, NH (US)

(72) Inventors: James J. Corbett, Manchester, NH (US); David L. Kjendal, Durham, NH (US); Jamie R. Woodhead, Pelham, NH (US)

(73) Assignee: Senet, Inc., Portsmouth, NH (US)

( * ) Notice: Subject to any disclaimer, the term of this patent is extended or adjusted under 35 U.S.C. 154(b) by 0 days.

(21) Appl. No.: 16/403,898

(22) Filed: May 6, 2019

Related U.S. Application Data

(60) Provisional application No. 62/768,170, filed on Nov. 16, 2018.

(51) Int. Cl.
| | |
|---|---|
| *H04L 12/46* | (2006.01) |
| *H04L 29/08* | (2006.01) |
| *H04W 76/10* | (2018.01) |
| *H04L 12/24* | (2006.01) |
| *H04W 8/18* | (2009.01) |
| *H04W 88/16* | (2009.01) |
| *H04W 84/04* | (2009.01) |

(52) U.S. Cl.
CPC .......... *H04L 67/10* (2013.01); *H04L 12/4641* (2013.01); *H04L 41/5019* (2013.01); *H04W 8/18* (2013.01); *H04W 76/10* (2018.02); *H04W 84/04* (2013.01); *H04W 88/16* (2013.01)

(58) Field of Classification Search
CPC . H04L 67/10; H04L 12/4641; H04L 41/5019; H04W 8/18; H04M 15/8016
See application file for complete search history.

(56) References Cited

U.S. PATENT DOCUMENTS

| | | | | |
|---|---|---|---|---|
| 8,041,335 | B2 * | 10/2011 | Khetawat | .............. H04L 63/104 |
| | | | | 455/404.2 |
| 2013/0242757 | A1 * | 9/2013 | Tsai | ........................ H04L 12/44 |
| | | | | 370/244 |
| 2016/0112870 | A1 | 4/2016 | Pathuri | |
| 2017/0149614 | A1 | 5/2017 | Zheng | |

(Continued)

OTHER PUBLICATIONS

Office Action dated Jun. 9, 2020 for U.S. Appl. No. 16/206,396, 24 Pages.

*Primary Examiner* — Wei Zhao
(74) *Attorney, Agent, or Firm* — Maine Cemota & Rardin

(57) ABSTRACT

A singular federated Low Power Wide Area Virtual Network (LVN) computing system and method provides a controlling interface between Radio Access Network (RAN) Provider participants and participating Application Provider End-Devices. The system leverages the advantages of each RAN Provider participant. It allows Application Providers to use a variety of RANs, and RAN Providers to offer services to Application Providers without the need for direct relationships. Steps include an End-Device transmitting a message, receiving the End-Device transmission at one or more gateways, determining if the End-Device is a LVN member, if no, discard the transmission message, if yes, test the validity of the received end device transmission message at a network controller, if not valid, discard the transmission message, if valid, weight the message by the receiving gateway's class, fractionalize the message, and attribute value to the RAN provider and the Application Provider.

20 Claims, 8 Drawing Sheets

(56) References Cited

U.S. PATENT DOCUMENTS

2017/1031582       11/2017  Entezari
2018/0115652 A1*   4/2018   Russell .................. H04W 4/14
2018/0373505 A1    12/2018  Engquist

* cited by examiner

INTERNET OF THINGS NETWORK SYSTEM COMPONENTS

IoT NETWORK CONTROLLER OVERVIEW

RAN PROVIDER EXAMPLES FOR THE LVN IOT NETWORK

WORKFLOW OVERVIEW

600

| CLASS | SLA | WEIGHT |
|---|---|---|
| CARRIER GRADE | 7X24 MONITORING WITH DEDICATED RESPONSE TEAMS | 10 |
| ENTERPRISE GRADE | BUSINESS HOURS MONITORING WITH DEDICATED RESPONSE TEAMS | 5 |
| CONSUMER GRADE | BUSINESS HOURS MONITORING AND BEST EFFORT RESPONSE WINDOWS | 1 |
| DEVELOPER/COMMUNITY | NONE | 0 |

VARIABLE GATEWAY WEIGHTING

RAN PROVIDER APPLICATION ACCOUNTING

METHOD FLOW CHART

SYSTEM AND METHOD FOR LOW POWER WIDE AREA VIRTUAL NETWORK FOR IOT

RELATED APPLICATIONS

This application claims the benefit of U.S. Provisional Applications No. 62/768,170 filed Nov. 16, 2018, which is herein incorporated by reference in its entirety for all purposes. Each of U.S. Provisional Patent Application No. 62/588,595 filed Nov. 20, 2017 and U.S. Utility patent application Ser. No. 16/196,011 filed Nov. 20, 2018, each titled IoT NETWORK CONTROLLER/SERVER, and each of U.S. Provisional Patent Application No. 62/594,133 filed Dec. 4, 2017 and U.S. Utility patent application Ser. No. 16/206,396 filed Nov. 30, 2018, each titled METHOD FOR GATEWAY ONBOARDING FOR IOT NETWORKS is herein incorporated by reference in its entirety for all purposes.

FIELD OF THE DISCLOSURE

Embodiments relate to a device, system, and method in the field of the Internet of Things and, more particularly, to a system for a Low Power Wide Area Virtual Network (LVN) wherein multiple members provide capabilities and receive services based on their needs and resources.

BACKGROUND

The Internet of things (IoT) refers to the network of physical objects with Internet connectivity (connected devices), and the communication between them. These connected devices and systems collect and exchange data. The IoT has been defined as "the infrastructure of the information society". The IoT extends Internet connectivity beyond traditional devices such as desktop and laptop computers and smart phones to a range of devices and everyday things that use embedded technology to communicate and interact with the external environment.

There are great challenges related to connecting such devices, as they will number in the billions, must be able to operate for long periods of time without physical connections to both the power grid and the Internet, and may monitor and control critical systems. In order to serve the greatest number of applications and provide the transformation of the modern world that result from connecting all manner of physical objects, the costs of these solutions, both the physical devices as well as the networks used for communicating with them must be exceedingly small.

Access to such devices is delivered via wireless communications technologies and as such is supported by radio frequency gateways or access points, which create the wireless Radio Access Network (RAN). Gateways provide the bidirectional wireless connectivity supporting the secure data transmission necessary to connect the IoT to the systems which ultimately extract and deliver valuable information. Historically, End-Devices have been responsible for negotiating associations with nearby gateways to support their communications; examples of this are the current WiFi and Cellular networks. This approach is not optimal for extremely low cost and battery powered devices. Modern centralized network architectures, sometimes called Software Defined Networks (SDNs) provide an approach to optimize the network to serve these constrained devices; the LoRaWAN Specification maintained by the LoRa Alliance network defines the architecture of one such system. In such an architecture, a single transmission for an End-Device may be received and processed by many gateways; these gateways pass all communications from the end-devices to a centralized control service which deduplicates and validates the message prior to forwarding it to the Application Provider. The centralized controller is thus able to optimize the end-device and network configurations while minimizing End-Device complexity, cost and power consumption. In addition, this system architecture facilitates very low cost (low-touch or zero touch) End-Device deployment and information delivery solutions. However, these benefits are eroded when many distinct networks (each independently controlled) are necessary to provide the communication service to the end-devices. Massive scale deployment of the IoT requires a pervasive RAN to provide the wireless connectivity to national or even global deployments of End-Devices. Consequences of a lack of cooperative RAN deployments include extra cost due to the duplication of physical infrastructure and significant performance degradation due to Physical and MAC layer interference. By taking all of the available RAN capacity and making it easy and financially beneficial to all parties to be shared, critical barriers to the rapid adoption and deployment of IoT solutions will be removed.

What is required is a system and method which enables and incentivizes an IoT network build out that is cooperative and equitable, secure, efficient, low-cost, low-power, fast, and can scale to connect billions of End-Devices.

SUMMARY

An embodiment provides an Internet of things (IoT) singular federated Low Power Wide Area Virtual Network (LVN) computing system for controlling associations between at least one Radio Access Network (RAN) Provider and at least one Application Provider comprising a singular federated LVN Provider providing a singular federated LVN network controller; at least one Radio Access Network (RAN) Provider; at least one Application Provider; at least one LVN gateway; a plurality of End Devices; associating at least one of the plurality of End Devices with one of the at least one Application Providers; transmitting wirelessly from one of the at least one End Devices; receiving an End Device transmission wirelessly from the End Device of the at least one the LVN gateway; sending the End Device transmission from the LVN gateways to the singular federated LVN network controller; in a processor of the singular federated LVN network controller, determining if the End Device is an LVN member; discarding a message of the End Device transmission if the End Device is not an LVN member; testing the integrity of the message; discarding the message if the integrity test failed; testing the identity of the message; discarding the message if the identity test failed; weighting a value of the message across all receiving gateways if the message integrity and the message identity are valid; correlating the weighted message value with a predetermined value of the End Device transmission; deduplicating and delivering the message to the Application Provider; whereby the correlated value is attributed to the RAN Providers providing wireless connectivity to the End-Device; and wherein the singular federated LVN eliminates relationships and agreements directly between participating RAN Providers and participating Application Providers. In embodiments weighting the message value across all receiving gateways comprises fractionalizing, by class of receiving gateway(s), a message value wherein a sum of a fractionalized message is equal to a contracted value of an original single transmission; and attributing an Application Provider network connectivity fee associated with RAN usage, modified by a transactional fraction, to RAN Providers owning and operating gateways which processed the End-Device transmission. Other embodiments comprise determining all receiving gateways for each End Device transmission. In subsequent embodiments the processor of the singular federated LVN network controller tallies duplicate communications from each gateway and fractionalizes each message based on a number of participating gateways, using each gateway's assigned weight. For additional embodiments, determining if the deployed at least one End Device is an LVN member comprises matching an ID of the End Device with an End Device ID associated with an enrolled Application Provider. In another embodiment, the memory of the singular federated LVN network controller stores participation association data. For a following embodiment, testing the integrity and testing the identity of the message are performed in the processor of the singular federated LVN network controller. Subsequent embodiments comprise weighted RAN classes used to facilitate allocating participation for delivering connectivity to End-Devices. In additional embodiments, RAN Class data is derived at least partially from a Service Level Agreement (SLA). In included embodiments the at least one Radio Access Network (RAN) Provider comprises LVN network resources. Yet further embodiments comprise enrolling at least one RAN Provider. In related embodiments the RAN Providers may comprise Application Providers, System Integrators, Municipalities, IoT Enterprises, Tower Operators, and Network Operators. Further embodiments comprise enrolling at least one Application Provider. In ensuing embodiments the at least one Application Provider comprises a plurality of associated End-Devices.

Another embodiment provides a method for an Internet of things (IoT) singular federated Low Power Wide Area Virtual Network (LVN) computing system for controlling associations between at least one Radio Access Network (RAN) Provider and at least one Application Provider comprising deploying at least one of a plurality of End Devices, the at least one End Device being associated with one of an Application Provider; transmitting wirelessly from one of the deployed at least one End Devices; receiving an End Device transmission wirelessly from the deployed End Device by one of the at least one LVN gateways; sending the End Device transmission from the LVN gateway to a singular federated LVN network controller; in a processor of the singular federated LVN network controller, determining if the deployed End Device is an LVN member; discarding a message of the End Device transmission if the deployed End Device is not an LVN member; weighting a value of the message across all receiving gateways if the message integrity and the message identity are valid; correlating the weighted message value with a predetermined value of the End Device transmission; and delivering the message to the Application Provider; whereby the correlated value is attributed to the RAN Providers providing wireless connectivity to the End-Device; and wherein the singular federated LVN eliminates relationships and contract agreements directly between participating RAN Providers and participating Application Providers. Other embodiments comprise storing, in a storage device of the singular federated LVN network controller, data representing membership of the at least one Application Provider and the at least one RAN Provider. For more embodiments, the method is cooperative, whereby RAN deployments avoid physical and MAC layer interference. In continued embodiments, the testing of a message of the End Device transmission if the End Device is an LVN member comprises testing the integrity of the message; discarding the message if the integrity test failed; testing the identity of the message; and discarding the message if the identity test failed. For additional embodiments, testing the identity of the message comprises testing that the End-Device of the message is known to the Network Controller, is in an administratively billable state, and authorized to use the Low Power Wide Area Virtual Network.

A yet further embodiment provides an Internet of things (IoT) singular federated Low Power Wide Area Virtual Network (LVN) computing system for controlling associations between at least one Radio Access Network (RAN) Provider and at least one Application Provider comprising a singular federated Low Power Wide Area Virtual Network (LVN) Provider providing a singular federated LVN network controller; at least one Radio Access Network (RAN) Provider; at least one Application Provider; at least one LVN gateway; a plurality of End Devices; deploying at least one of the plurality of End Devices, the at least one End Device being associated with one of the at least one Application Providers; transmitting wirelessly from one of the deployed at least one End Devices; receiving an End Device transmission wirelessly by one of the at least one the LVN gateways; sending the End Device transmission from the LVN gateway to the singular federated LVN network controller; in a processor of the singular federated LVN network controller, determining if the deployed End Device is an LVN member; discarding a message of the End Device transmission if the deployed End Device is not an LVN member; testing the integrity of the message in the processor of the singular federated LVN network controller; discarding the message if the integrity test failed; testing the identity of the message in the processor of the singular federated LVN network controller; discarding the message if the identity test failed; weighting a value of the message across all receiving gateways if the message integrity and the message identity are valid in the processor of the singular federated LVN network controller; correlating the weighted message value with a predetermined value of the End Device transmission in the processor of the singular federated LVN network controller; and delivering the message to the Application Provider; whereby the correlated value is attributed to the RAN Providers providing wireless connectivity to the End-Device; and wherein the singular federated LVN eliminates contractual relationships and agreements directly between participating RAN Providers and participating Application Providers.

Embodiments include a Low Power Wide Area Virtual Network (LVN) computing system and method for managing a cooperative network. Additional embodiments provide a Low Power Wide Area Virtual Network (LVN) computing system and method for singular federated, cooperative, Radio Access Network (RAN) availability, consisting of one or more radio frequency gateways or Access Points, supplied and maintained by a plurality of RAN Providers which leverage the natural advantages of each individual RAN Provider; whereas the resulting system yields a pervasive, unified, RAN that is open and available for use by any Application Provider with LVN membership access through any and all of the RAN Providers comprising the federation defined by the LVN, without requiring individually contracted relationships between the Application Provider and any of the RAN Providers; the system providing the accounting and payment methods to compensate all participating parties while obscuring the contract details from the RAN Provider; steps comprising a deployed end-device; the end-device transmitting; receiving the end-device transmission by an LVN gateway(s); determining if the end-device is a LVN member, if yes; testing message integrity and device identity at a centralized network controller; if not valid, discarding; if valid, weight message value across all receiving gateways, by class, fractionalize message value whereby the sum of the fractionalized message is equal to the contracted value of the original single transmission, and attribute the Application Provider network usage/connectivity fee associated with RAN usage modified by transactional fraction to the RAN providers owning and operating the gateways which processed the end-device transmission.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Figure 1:
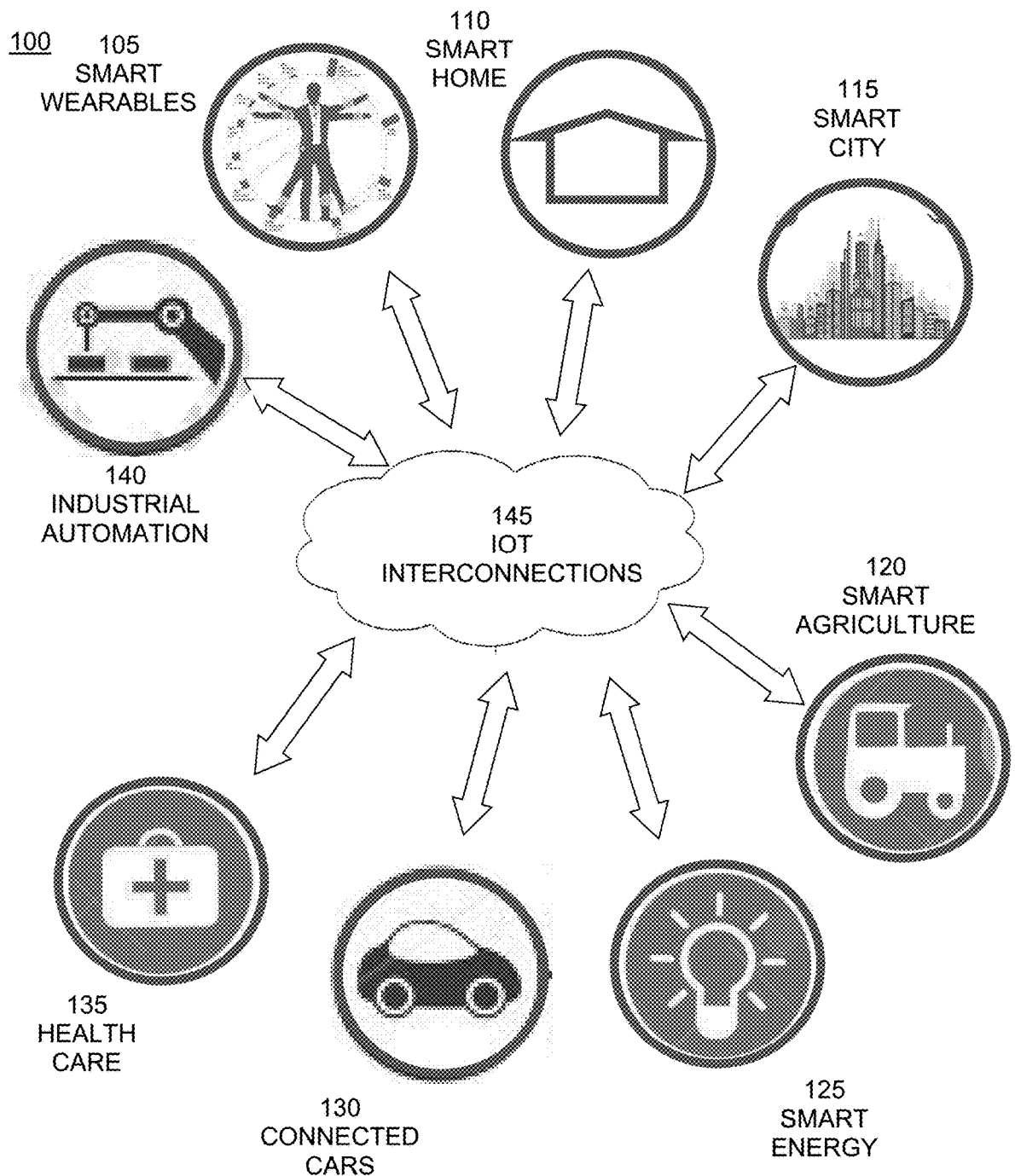
FIG. 1 depicts a general IoT operational environment configured in accordance with an embodiment of the invention.

FIG. 1 is a general IoT operational environment 100. Embodiments support IoT devices in the fields of smart wearables 105, smart home 110, smart city 115, smart agriculture 120, smart energy 125, connected cars 130, health care 135, and industrial automation 140. Each device in each field is interconnected 145 to support the applications relevant to each.

Figure 2:
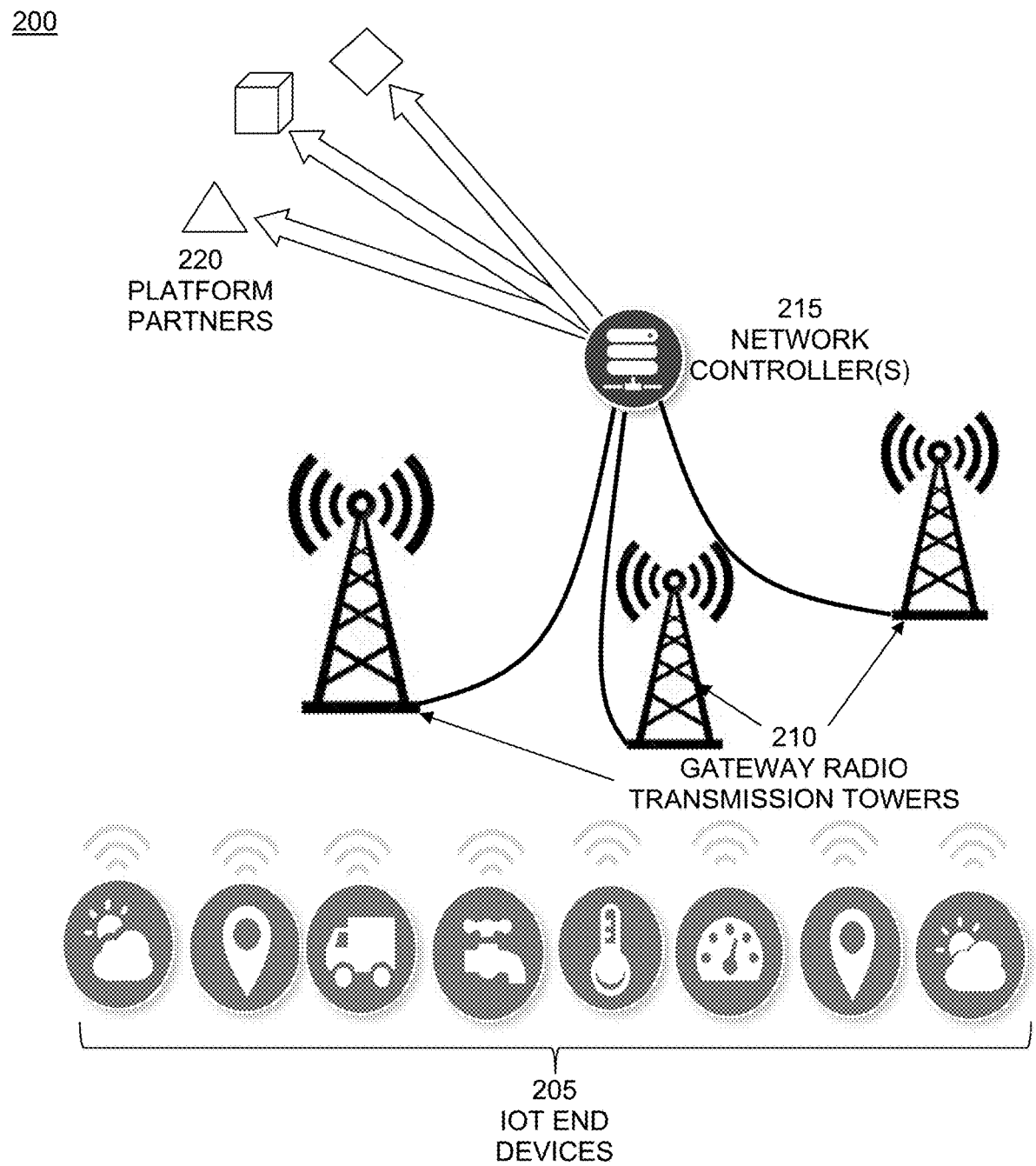
FIG. 2 depicts system components configured in accordance with an embodiment of the invention.

FIG. 2 depicts components 200 for a system for a low power wide area virtual network (LVN) for IoT. Embodiments provide network transport, security, data streaming/data warehousing, and end device management. Nonlimiting examples of End Devices 205 comprise sensors, actuators, and trackers. In embodiments, End Devices 205 communicate with LVN gateway radios 210 which relay communication from the end devices to the singular federated LVN network controller 215. The Network Controller 215 manages the radio access network, and receives and validates messages from the End-Devices before delivering them to the Applications serviced through Platform Partners 220.

Figure 3:
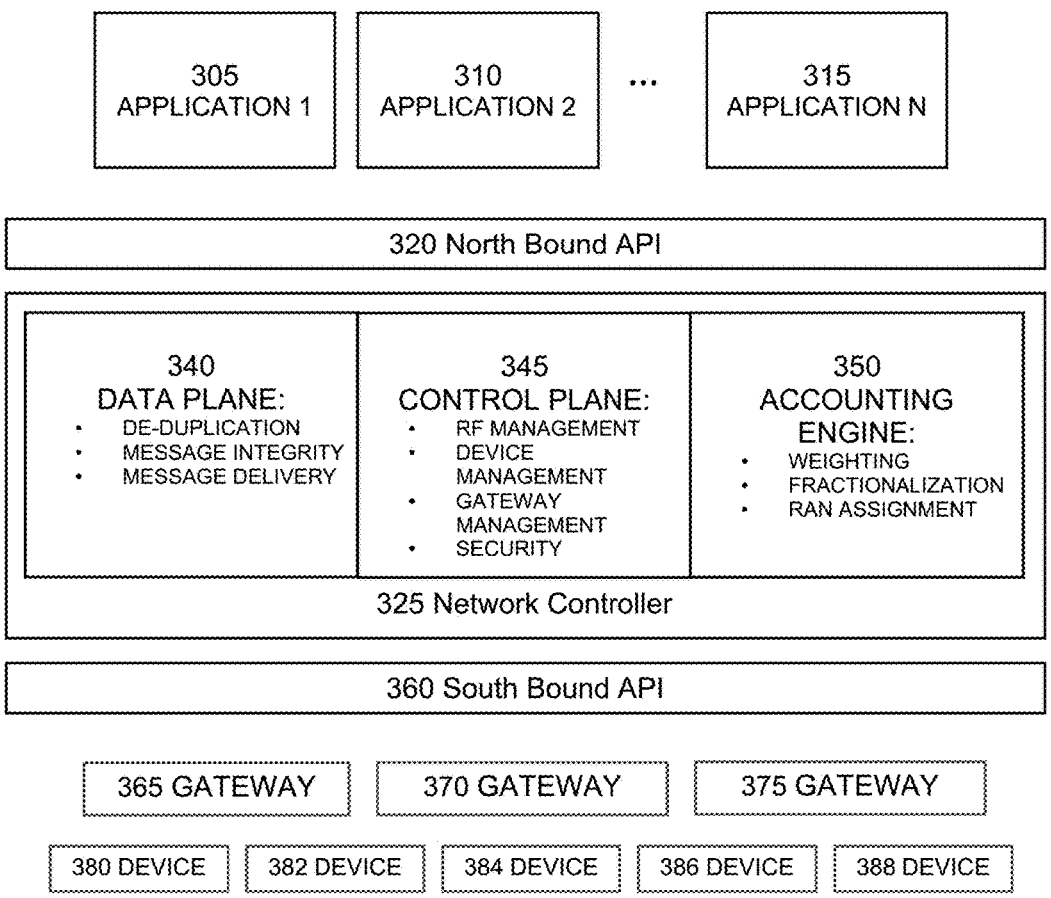
FIG. 3 depicts a high level block diagram of an application controller and network controller configured in accordance with an embodiment.

FIG. 3 is a high level block diagram 300 of a Network Controller and interfaces. Network Controller 325, Data Plane Management 340, Control Plane Management 345, and Accounting Engine 350. End Devices 380, 382, 384, 386, 388 . . . use Gateways 365, 370, 375 . . . to relay wireless transmissions to the Network Controller using South Bound API 360. Network Controller 325 uses the North Bound API 320 to communicate with the Applications 305, 310 . . . 315.

In embodiments, the LVN Provider provides the North Bound API 320, Network Controller 325, and South Bound API 360. In embodiments, the RAN Providers provide Gateways 365, 370, 386, 388 . . . . In embodiments, the Application Providers provide Applications 305, 310 . . . 315 and End Devices 380, 382, 384, 386, 388 . . . .

In embodiments, Data Plane Management 340 is responsible for de-duplication, message integrity, and message delivery; Control Plane Management 345 comprises RF management, device management, gateway management, and security; and Accounting Engine 350 comprises functions of weighting, fractionalization, and RAN assignment.

LVN members cooperate, using the aggregate network, without requiring the knowledge or the need for a direct contracted relationship with each participating member. The LVN is a singular federated network. Singular federated networks provide the infrastructure to share resources among multiple independent networks to optimize use, improve quality, and reduce costs. In embodiments, the singular federated network eliminates relationships and agreements directly between any participating RAN Providers and participating Application Providers. LVN members include Application Providers, Solution Integrators, Municipalities and Enterprises, for example, who offer IoT solutions to their customers ("Solution Providers"), Network Operators who offer IoT network connectivity to their customers, and RAN Providers with RAN assets infrastructure. All LVN members may also operate as any combination of Solution Providers, Network Operators, or RAN Providers, and, in addition, may also function as RAN Providers who deploy and operate Radio Access Networks (RANs). Network Operators and RAN Providers contract with the LVN directly. Application Providers and System Integrators contract with a participating Network Operator when joining the LVN.

Figure 4:
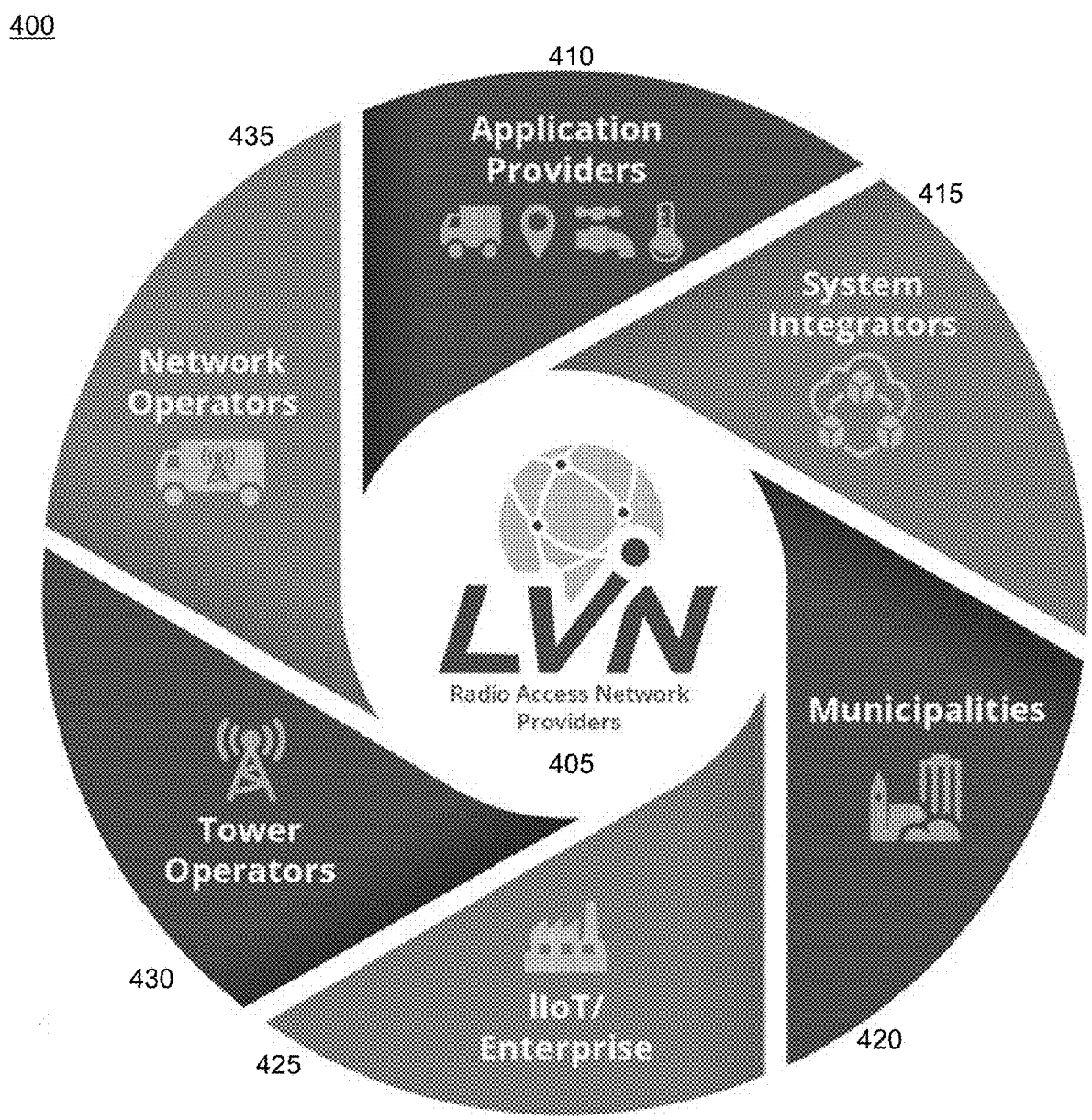
FIG. 4 depicts Radio Access Network (RAN) provider examples for the LVN IoT network configured in accordance with an embodiment.

FIG. 4 depicts Radio Access Network (RAN) provider aspects 400. A RAN Provider 405 generates revenue from assets (towers, roof tops, billboards, light poles) by installing low-cost LVN gateways and becoming an LVN member. RAN Providers 405 install, and maintain gateways at their own expense. In embodiments, these RAN Providers comprise Application Providers 410, System Integrators 415, Municipalities 420, IoT Enterprises 425, Tower Operators 430, and Network Operators 435. All LVN members may also operate as any combination of Solution Providers, Network Operators, or RAN Providers, and, in addition, may also function as RAN Providers who deploy and operate Radio Access Networks (RANs). For embodiments, RAN Providers can just put up Gateways and have no Application. Application Providers, etc. can also be RAN Providers supporting their applications by deploying GWs.

Figure 5:
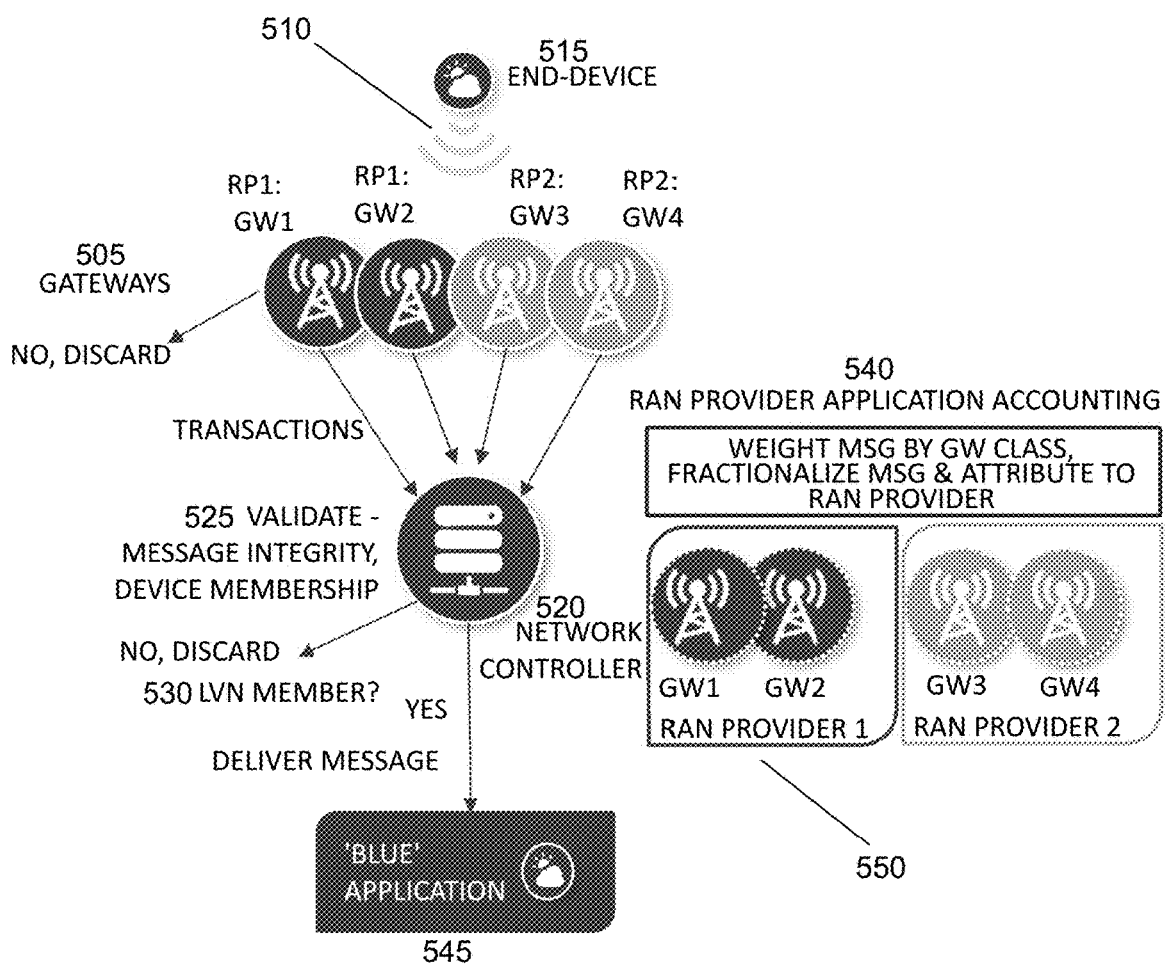
FIG. 5 is an example workflow for evaluating the RAN Providers LVN contribution configured in accordance with an embodiment.

FIG. 5 depicts an example workflow 500 for evaluating the RAN Provider's LVN contribution for service delivery and Application message assignment. Each of the gateways, GW1-GW4 505 receives the wireless transmission 510 from the End-Device 515 and relays the uplink to the Network Controller 520. The Network Controller 520 tests the relayed End-Device transmission from each LVN gateway 505 for validity 525 and membership 530 of the End-Device 515 in the LVN. When both criteria are met, the transaction is included in the fractionalization and weighting accounting process 540 which creates proportional, shared 'message' credits for delivering connectivity to the End-Device 515 for that transaction. The sum of the fractionalized message weight is always equal to one, equivalent to the single original transmission sent by the End Device 515. This weighted fractionalization represents the aggregate, percentage, value of the gateways' contribution to the delivery of the message to the Application 545. When the message is delivered by a non-redundant gateway deployment, the entire fractionalized message value of 1 is attributed to the sole RAN Provider 550 who is supplying the connectivity. The message, in turn, is delivered to the Application 545.

Application Providers and Network Operators with contracted LVN membership have a portion of the network access fees reserved, establishing the revenue share pool that is paid to the RAN Providers. The LVN collects these fees and provides the accounting necessary to pay the RAN Providers proportionally for the connectivity provided to each application.

Radio Access Network (RAN) Providers install and maintain gateways. RAN Providers are paid for usage/connectivity on their RAN based upon their role/investment in network. RAN Providers benefit from the LVN by providing Application Providers with connectivity. To encourage highly available network deployments, RAN Provider revenue sharing is based on weightings, the better the Service Level Agreement (SLA) on the gateway, the more the RAN provider gets paid, proportionately. Revenue sharing by gateway class encourages high quality network builds. In embodiments, there may be many classes of gateway. In embodiments, one way a value is derived is by the SLA on the GW yielding the class designation. As an example in the illustrations, there are four RAN gateway classes: 1) Carrier/Operator/Service Provider: 24 hour monitoring and dedicated response teams; 2) Enterprise: business hours monitoring and business hours response; 3) Consumer: business hours monitoring and RMA by mail; and 4) Developer/Community: not a participant in the LVN revenue share. In embodiments, LVN Application connectivity is allowed on any LVN Radio Access Network (RAN).

Figure 6:
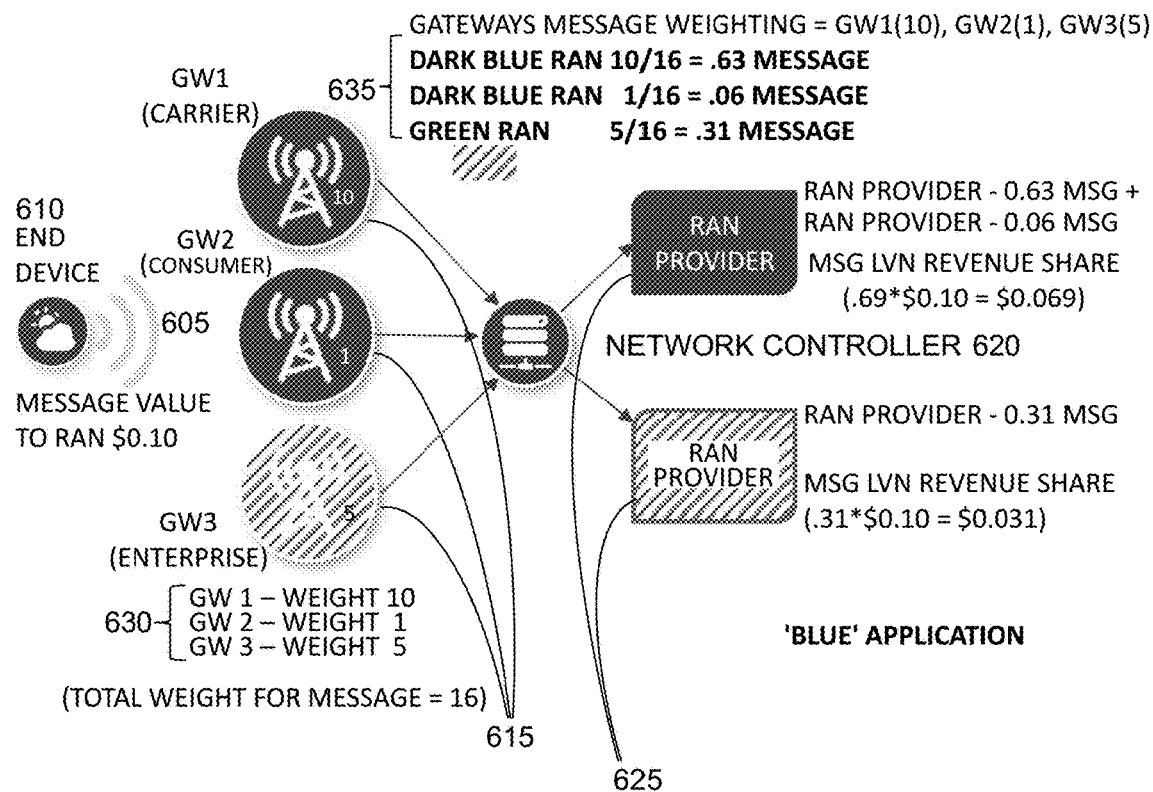
FIG. 6 depicts variable gateway weighting configured in accordance with an embodiment.

FIG. 6 illustrates multiple RAN Providers providing service 600 to the End-Device, illustrating variable weighting for message fractionalization based on RAN gateway class. A communication 605 is sent from the End-Device 610 and multiple gateways 615 receive it. Each gateway that heard the End-Device 605 forwards the communication to the Network Controller 620. The Network Controller 620 tallies the duplicate communication from each gateway 615, and fractionalizes the message based on the number of participating gateways using their assigned weight. RAN gateways are deployed by a wide variety of participants, including Network Operators, Enterprises, Consumers, and Developers. The deployments are differentiated by network investment for providing the varying levels of network SLA performance. To support each RAN Provider gateway deployment type, the LVN revenue share payout is weighted to align to the actual cost incurred to operate each gateway site.

When an end device transmission is received by multiple gateways 615 operated by multiple RAN Providers 625, the LVN revenue share payment will be shared and weighted by the RAN class of each gateway. The total weighted message value 630 is established by adding each participating gateway's weight. The fractional message contribution 635, by gateway, is established by dividing the participating gateway's individual weight by the total weight. Each Fractionalized contribution is tallied and aggregated into the RAN Providers application accounting. The RAN Provider application accounting is cumulative by each Application serviced. This is the basis for paying the RAN Providers the LVN Revenue Share.

Figure 7:
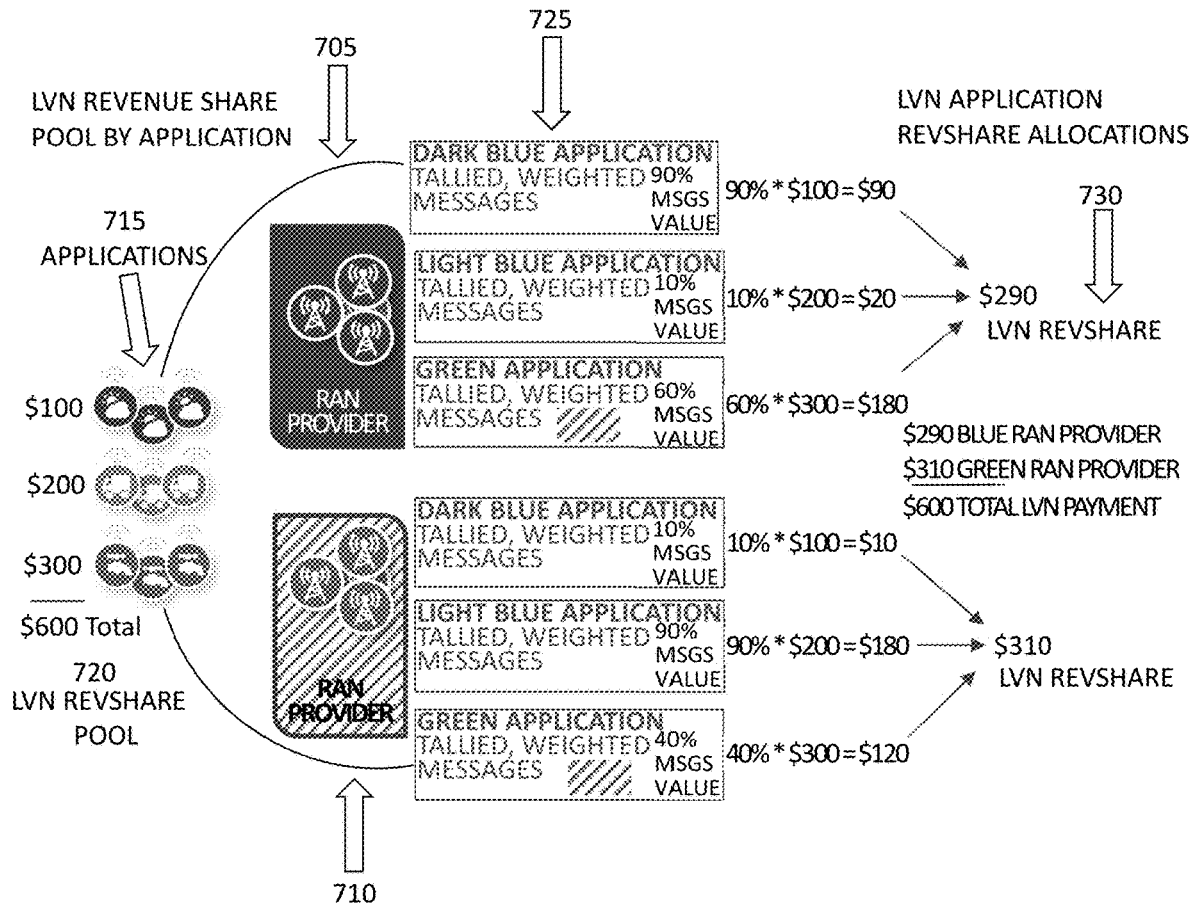
FIG. 7 depicts a method for calculating message parameters configured in accordance with an embodiment.

FIG. 7 depicts RAN Provider application accounting 700 as described in the earlier illustrations. It depicts two RAN Providers 705, 710, each providing connectivity to three Applications 715. The Application Provider has a contract that establishes an LVN Revenue Share pool and the Revenue Share is collected from the Application Provider for distribution to the LVN members. The traffic from each of applications 715 is tallied by the Network Controller and provides the accounting necessary to proportionally allocate the Revenue Share pool 720 to the RAN Provider providing application connectivity 725. The RAN Provider LVN total revenue share 730 is the aggregation of multiple Application Providers' using connectivity provided by the RAN Provider. The aggregation is the combined settlement the RAN Provider receives for participating in the LVN.

Figure 8:
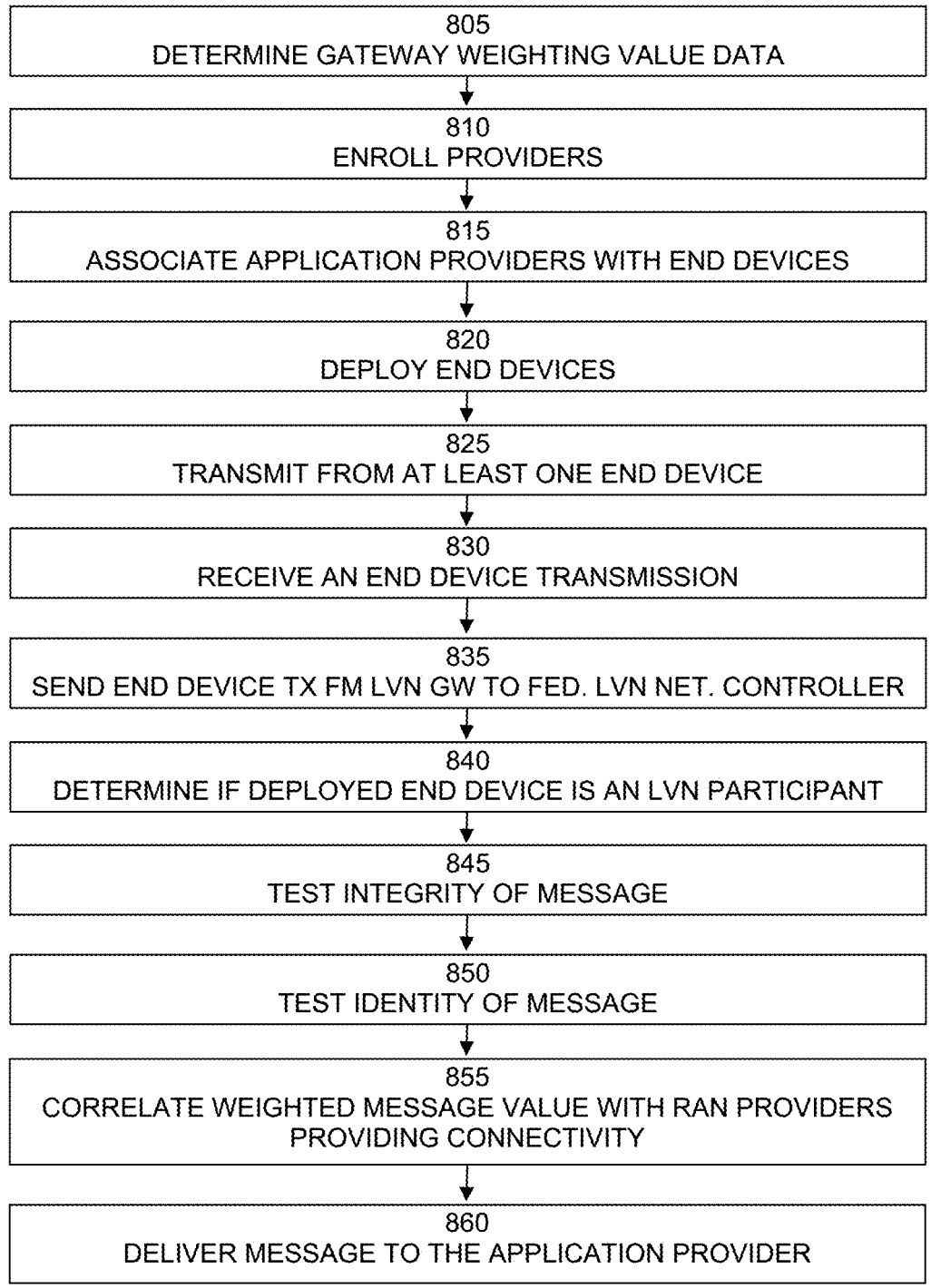
FIG. 8 is a flow chart depicting a method for calculating message parameters configured in accordance with an embodiment.

FIG. 8 is a flow chart 800 of a method for a singular federated Low Power Wide Area Virtual Network (LVN) computing system used in the Internet of Things (IoT). Embodiment steps comprise determining Gateway weighting value 805; enrolling RAN Providers and Application Providers 810; associating Application Providers with End Devices 815; deploying End Devices 820; transmitting from at least one End Device 825; receiving an End Device transmission from an End Device by at least one LVN gateway 830; sending the End Device transmission from the LVN gateway to a singular federated LVN network controller 835; determining, in a processor of the singular federated LVN network controller, if the deployed End Device is an LVN member 840, discarding a message of the End Device transmission if the deployed End Device is not an LVN member; testing integrity of the message 845, discarding the message if the integrity test failed; testing the identity of the message 850, discarding the message if the identity test failed; weighting a value of the message across all receiving gateways if the message integrity and the message identity are valid; correlating the weighted message value with the RAN Providers providing connectivity 855; and deliver the message to the Application Provider 860. In embodiments, for identity test 850, the device has to be known to the network controller and in an administratively billable state.

The Low Power Wide Area Virtual Network (LVN) computing system used in the Internet of Things (IoT) platform for performing (or controlling) the operations or functions described hereinabove with respect to the system and/or the method may include a processor, I/O devices, a memory system, and a network adaptor. The computing system includes program modules for performing (or controlling) the operations or functions described hereinabove with respect to the system and/or the method according to exemplary embodiments. For example, the program modules may include routines, programs, objects, components, logic, data structures, or the like, for performing particular tasks or implement particular abstract data types. The processor may execute instructions written in the program modules to perform (or control) the operations or functions described hereinabove with respect to the system and/or the method. The program modules may be programmed into the integrated circuits of the processor. In an exemplary embodiment, the program modules may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using a network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. An Internet of things (IoT) singular federated Low Power Wide Area Virtual Network (LVN) computing system for controlling associations between at least one Radio Access Network (RAN) Provider and at least one Application Provider comprising:
    a singular federated LVN Provider providing a singular federated LVN network controller;
    at least one Radio Access Network (RAN) Provider;
    at least one Application Provider;
    at least one LVN gateway;
    a plurality of End Devices;
    associating at least one of said plurality of End Devices with one of said at least one Application Providers;
    transmitting wirelessly from one of said at least one End Devices;
    receiving an End Device transmission wirelessly from said End Device of said at least one said LVN gateway;
    sending said End Device transmission from said LVN gateways to said singular federated LVN network controller;
    in a processor of said singular federated LVN network controller, determining if said End Device is an LVN member;
    discarding a message of said End Device transmission if said End Device is not an LVN member;
    testing integrity of said message;
    discarding said message if said integrity test failed;
    testing identity of said message;
    discarding said message if said identity test failed;
    weighting a value of said message across all receiving gateways if said message integrity and said message identity are valid;
    correlating said weighted message value with a predetermined value of said End Device transmission; deduplicating and
    delivering said message to said Application Provider;
    whereby said correlated value is attributed to said RAN Providers providing wireless connectivity to said End-Device; and
    wherein said singular federated LVN eliminates relationships and agreements directly between participating RAN Providers and participating Application Providers.

2. The system of claim 1, wherein said weighting message value across all receiving gateways comprises:
    fractionalizing, by class of receiving gateway(s), a message value wherein a sum of a fractionalized message is equal to a contracted value of an original single transmission; and
    attributing an Application Provider network connectivity fee associated with RAN usage, modified by a transactional fraction, to RAN Providers owning and operating gateways which processed said End-Device transmission.

3. The system of claim 1, comprising determining all receiving gateways for each End Device transmission.

4. The system of claim 1, wherein said processor of said singular federated LVN network controller tallies duplicate communications from each gateway and fractionalizes each message based on a number of participating gateways, using each gateway's assigned weight.

5. The system of claim 1, wherein said determining if said End Device is an LVN member comprises matching an ID of said End Device with an End Device ID associated with an enrolled Application Provider.

6. The system of claim 1, wherein a memory of said singular federated LVN network controller stores participation association data.

7. The system of claim 1, wherein said testing integrity and said testing identity of said message are performed in said processor of said singular federated LVN network controller.

8. The system of claim 1, comprising weighted RAN classes used to facilitate allocating participation for delivering connectivity to End-Devices.

9. The system of claim 1, wherein RAN Class data is derived at least partially from a Service Level Agreement (SLA).

10. The system of claim 1, wherein said at least one Radio Access Network (RAN) Provider comprises LVN network resources.

11. The system of claim 1, comprising enrolling at least one RAN Provider.

12. The system of claim 1, wherein said RAN Providers are configured to comprise Application Providers, System Integrators, Municipalities, IoT Enterprises, Tower Operators, and Network Operators.

13. The system of claim 11, comprising enrolling at least one Application Provider.

14. The system of claim 1, wherein said at least one Application Provider comprises a plurality of associated End-Devices.

15. A method for an Internet of things (IoT) singular federated Low Power Wide Area Virtual Network (LVN) computing system for controlling associations between at least one Radio Access Network (RAN) Provider and at least one Application Provider comprising:
    deploying at least one of a plurality of End Devices, said at least one End Device being associated with one of an Application Provider;
    transmitting wirelessly from one of said deployed at least one End Devices;
    receiving an End Device transmission wirelessly from said deployed at least one End Device by one of at least one LVN gateways;
    sending said End Device transmission from said LVN gateway to a singular federated LVN network controller;
    in a processor of said singular federated LVN network controller, determining if said deployed End Device is an LVN member;
    discarding a message of said End Device transmission if said deployed End Device is not an LVN member;
    weighting a value of said message across all receiving gateways if said message integrity and said message identity are valid;
    correlating said weighted message value with a predetermined value of said End Device transmission; and
    delivering said message to said Application Provider;
    whereby said correlated value is attributed to said RAN Providers providing wireless connectivity to said End-Device; and
    wherein said singular federated LVN eliminates relationships and contract agreements directly between participating RAN Providers and participating Application Providers.

16. The method of claim 15, comprising storing, in a storage device of said singular federated LVN network controller, data representing membership of said at least one Application Provider and said at least one RAN Provider.

17. The system of claim 15, wherein said method is cooperative, and whereby RAN deployments avoid physical and MAC layer interference.

18. The system of claim 15, wherein testing of a message of said End Device transmission if said End Device is an LVN member comprises:
    testing integrity of said message;
    discarding said message if said integrity test failed;
    testing identity of said message;
    discarding said message if said identity test failed.

19. The system of claim 15, wherein said testing identity of said message comprises testing that said End-Device of said message is known to said Network Controller, is in an administratively billable state, and authorized to use said Low Power Wide Area Virtual Network.

20. An Internet of things (IoT) singular federated Low Power Wide Area Virtual Network (LVN) computing system for controlling associations between at least one Radio Access Network (RAN) Provider and at least one Application Provider comprising:
    a singular federated Low Power Wide Area Virtual Network (LVN) Provider providing a singular federated LVN network controller;
    at least one Radio Access Network (RAN) Provider;
    at least one Application Provider;
    at least one LVN gateway;
    a plurality of End Devices;
    deploying at least one of said plurality of End Devices, said at least one End Device being associated with one of said at least one Application Providers;
    transmitting wirelessly from one of said deployed at least one End Devices;
    receiving an End Device transmission wirelessly by one of said at least one said LVN gateways;
    sending said End Device transmission from said LVN gateway to said singular federated LVN network controller;
    in a processor of said singular federated LVN network controller, determining if said deployed End Device is an LVN member;
    discarding a message of said End Device transmission if said deployed End Device is not an LVN member;
    testing integrity of said message in said processor of said singular federated LVN network controller;
    discarding said message if said integrity test failed;
    testing identity of said message in said processor of said singular federated LVN network controller;
    discarding said message if said identity test failed;
    weighting a value of said message across all receiving gateways if said message integrity and said message identity are valid in said processor of said singular federated LVN network controller;
    correlating said weighted message value with a predetermined value of said End Device transmission in said processor of said singular federated LVN network controller; and
    delivering said message to said Application Provider;
    whereby said correlated value is attributed to said RAN Providers providing wireless connectivity to said End-Device; and
    wherein said singular federated LVN eliminates contractual relationships and agreements directly between participating RAN Providers and participating Application Providers.

* * * * *